Oct. 13, 1964    H. A. CHIVERS    3,152,726
APPARATUS FOR SUPPLYING A WASHING LIQUID
TO THE WINDSCREENS OF MOTOR VEHICLES
Filed Sept. 18, 1962    2 Sheets-Sheet 1
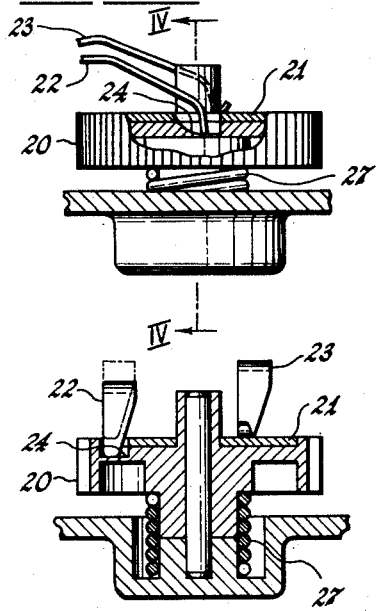
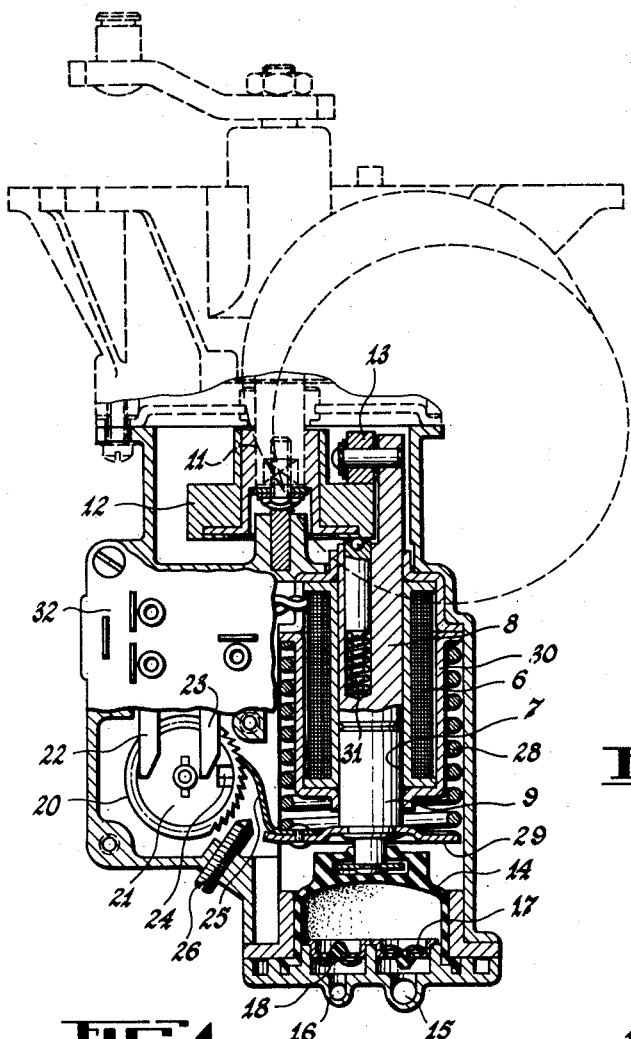
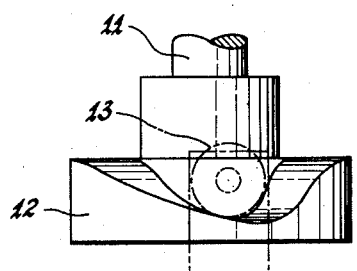
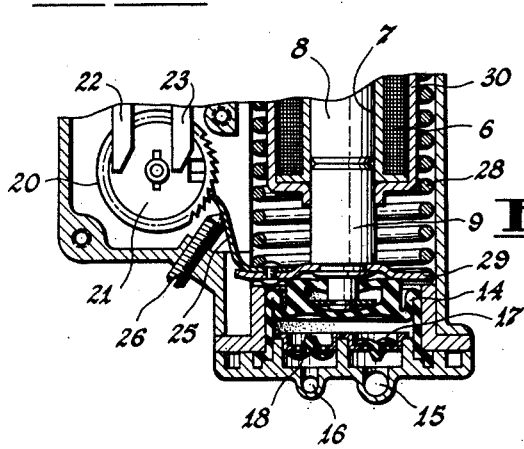
INVENTOR
HENRY A. CHIVERS
BY
ATTORNEYS Oct. 13, 1964                H. A. CHIVERS                3,152,726
         APPARATUS FOR SUPPLYING A WASHING LIQUID
                TO THE WINDSCREENS OF MOTOR VEHICLES
Filed Sept. 18, 1962                               2 Sheets-Sheet 2

INVENTOR.
HENRY ALBERT CHIVERS

BY *Imirie & Smiley*

ATTORNEYS.

_United States Patent Office_ 3,152,726
Patented Oct. 13, 1964

3,152,726
APPARATUS FOR SUPPLYING A WASHING LIQUID TO THE WINDSCREENS OF MOTOR VEHICLES
Henry Albert Chivers, "Whytegate," Bonds Road, Lower Plenty, Victoria, Australia
Filed Sept. 18, 1962, Ser. No. 224,495
Claims priority, application Australia, Oct. 5, 1961, 9,922/61
8 Claims. (Cl. 222—60)

The present invention relates to apparatus for supplying a washing liquid to the windscreens of motor vehicles when they are mobile or stationary and has for its primary object to provide reliable apparatus which is characterized by simplicity of construction and ease of operation.

According to the invention the apparatus comprises a solenoid having a tubular passageway extending lengthwise therethrough, a pair of axially aligned plungers composed of magnetic material adapted to reciprocate in the passageway and normally retained therein in spaced relationship, driving means adapted to be operatively connected to a motor for reciprocating one of the plungers in the passageway, and pumping means operatively connected to the other of the plungers for pumping liquid from a container onto a windscreen, the solenoid being adapted to attract the plungers into operative relationship when energized from a source of electric current to cause the one plunger to reciprocate the other plunger in the passageway thereby to operate the pumping means when the motor is operative.

In order that the invention may be readily understood reference is made to the accompanying drawings in which:

FIGURE 1 is a side elevation, partly in section, of the apparatus,

FIGURE 2 is a section of part of the apparatus of FIGURE 1 in a different operative position, FIGURE 3 is an end elevation of a part of the apparatus shown in FIGURES 1 and 2, FIGURE 4 is a section on the line IV—IV of FIGURE 3, FIGURE 5 is a detail view of a further part of the apparatus shown in FIGURE 1, and;

Figure 6:
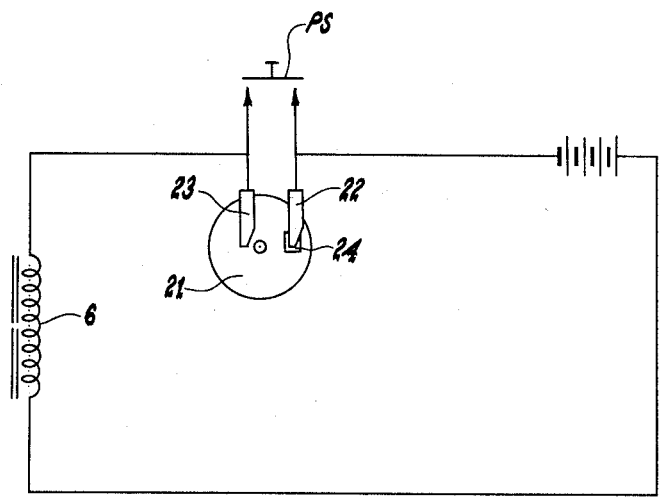
FIGURE 6 is a circuit diagram of the electrical circuit included in the apparatus.

Referring to the drawings the apparatus shown therein includes a solenoid 6, having a tubular passageway 7 extending lengthwise therethrough preferably centrally thereof.

The apparatus also includes a pair of axially aligned plungers 8 and 9 composed of magnetic material which are adapted to reciprocate in the passageway 7.

Driving means adapted to be operatively connected to a motor are provided for reciprocating the plunger 8 in the passageway 7. The motor may be that usually provided on a vehicle for operating the customary windscreen wipers. The driving means may include a drive shaft 11 which is adapted to be connected to the motor. The drive shaft has an actuating cam 12 keyed thereto, the cam co-operating with a roller 13 attached to the plunger 8. The cam 12 and roller 13 are more clearly shown in FIGURE 5.

The apparatus also includes pumping means operatively connected to the plunger 9 for pumping liquid from a container located in a suitable position on the vehicle onto the windscreen of the vehicle. The pumping means may include a diaphragm 14 which is adapted to be reciprocated by the plunger 9. The liquid is pumped by the diaphragm 14 from the inlet pipe 15 to the outlet pipe 16 via the valves 17 and 18.

The solenoid 6 is adapted to attract the plungers 8 and 9 into operative relationship when energized from a source of electric current such as the usual battery carried by the vehicle to cause the plunger 8 to reciprocate the plunger 9 in the passageway 7 to operate the pumping means when the motor is operative.

Automatic control means as shown in FIGURES 3 and 4 may be provided for opening the electrical circuit including the solenoid 6 to de-energize the solenoid after the pumping means has been operated for a predetermined period of time. The automatic control means may include a ratchet wheel 20 incorporating a contact plate 21 adapted to be explored in concentric paths by a pair of wiping contact strips 22 and 23 which connect the contact plate 21 in the electrical circuit. The path explored by the strip 22 includes an electrically non-conductive section 24. The automatic control means may also include a resilient arm 25 which is associated with the ratchet wheel 20 and is adapted to be operated by the diaphragm 14 so as to rotate the ratchet wheel 20 until the contact strip 22 reaches the non-conductive section so as to open the electrical circuit.

To vary the predetermined time for which the pumping means is operative an adjusting screw 26 may be provided. The adjusting screw 26 is adapted to contact the resilient arm 25 as shown in FIGURE 3 and, as it is adjusted, it will vary the distance of the thrust of the resilient arm. Thus the time required for one rotation of the ratchet wheel 20 may be varied according to the requirements.

To prevent rotation of the ratchet wheel in the reverse direction a stop spring 27 may be provided.

The plungers 8 and 9 are normally retained in spaced relationship so that, when the plunger 8 is reciprocated by the driving means, the other plunger 9 will not be reciprocated. Resilient spring means may be provided to retain the plungers in such relationship. The resilient spring means may consist of a helical spring 28 one end of which is connected to a stop washer 29 secured to the diaphragm 14 and the other end of which is attached to the housing 30 for the solenoid 6. The spring 28 is of a predetermined strength less than the force of attraction exerted on the plungers 8 and 9 by the solenoid 6 when it is energized but sufficient to retain the plungers in spaced relationship.

The apparatus may also include a return spring 31 housed within the plunger 8 for urging the roller 13 into engagement with the cam 12.

A terminal plate 32 may also be provided.

The apparatus is preferably adapted to operate in conjunction with the usual windscreen wiper mechanism for which purpose a dual switch which is electrically connected to the apparatus may be provided on the dashboard of the vehicle. One switch of the dual switch may be a rotary switch which will connect the windscreen wiper motor in circuit whilst the other switch may consist of a push button switch PS which is adapted to bridge the pair of contact strips 22 and 23 so as to complete the electrical circuit to the solenoid 6.

When the rotary switch is actuated the windscreen wiper motor is energized to operate the windscreen wipers. The plunger 8 will then be reciprocated in the passageway 7 by the cam 12 and roller 13 but as the plungers 8 and 9 are normally spaced from each other the plunger 9 will not be reciprocated by the plunger 8. When the push button switch is pressed the circuit to the solenoid 6 is completed to energized the solenoid. The plungers 8 and 9 will then be attracted together against the force exerted by the spring 28 until their opposed ends meet. The plunger 9 will then be reciprocated in the passageway 7 by the plunger 8 and the diaphragm 14 will be actuated to pump water onto the windscreen via the pipes 15 and 16. The solenoid 6 will remain energized after the push button switch is released until the ratchet wheel 20 rotates one revolution when the circuit is opened to deenergize the solenoid.

The push button switch is preferably linked with the rotary switch so that if it is pressed the rotary switch will also be actuated and the apparatus can only be operated when the windscreen wipers are operative.

Having now described my invention, what I claim as new and desire to secure by Letters Patent is:

1. Apparatus for supplying a washing liquid to the windscreen of a motor vehicle, comprising a solenoid having a tubular passageway extending lengthwise therethrough, a pair of axially aligned plungers composed of magnetic material mounted to reciprocate in said passageway, means for normally retaining said plungers in spaced relationship in said passageway, driving means adapted to be operatively connected to a motor and operatively connected to one of said plungers for reciprocating said one of said plungers in said passageway, and pumping means including a reciprocable diaphragm operatively connected to the other of said plungers for pumping liquid from a container onto said windscreen, the solenoid being adapted to attract said plungers into operative relationship when energized from a source of electric current to cause the one plunger to reciprocate the other plunger in said passageway thereby to operate the pumping means when the motor is operative.

2. Apparatus according to claim 1, in combination with an electrical circuit including said solenoid and automatic control means for opening said electrical circuit to de-energize said solenoid after the pumping means has been operative for a predetermined period of time, said automatic control means comprising a ratchet wheel driven by a resilient pawl connected to said reciprocable diaphragm and incorporating a contact plate adapted to be explored in concentric paths by a pair of wiping contact strips which connect said contact plate in the electrical circuit, one of said paths including an electrically non-conductive section, and said resilient pawl being operated by said diaphragm so as to rotate said ratchet wheel until the particular contact strip reaches the non-conductive section to open the electrical circuit.

3. Apparatus according to claim 1, wherein said driving means includes a drive shaft adapted to be connected to said motor, said drive shaft having an actuating cam mounted thereon adapted to co-operate with a roller attached to said one plunger.

4. Apparatus according to claim 1, wherein said driving means includes a drive shaft adapted to be connected to said motor, said drive shaft having an actuating cam cam mounted thereon adapted to co-operate with a roller attached to said one plunger, in combination with a return spring housed within said one plunger for urging said roller into engagement with said cam.

5. Apparatus for supplying a washing liquid to the windscreen of a motor vehicle, comprising a solenoid having a tubular passageway extending centrally therethrough, a pair of axially aligned rod-like plungers composed of magnetic material mounted to reciprocate lengthwise in said passageway, resilient spring means of predetermined strength for normally retaining said plungers in spaced relationship to each other in said passageway, driving means adapted to be operatively connected to a motor and operatively connected to one of said plungers for reciprocating said one of said plungers in said passageway, and pumping means operatively connected to the other of said plungers for pumping liquid from a container onto said windscreen, the solenoid being adapted to attract said plungers to bring them into abutting relationship against the force exerted by said resilient spring means when energized from a source of electric current to cause the one plunger to reciprocate the other plunger in said passageway to operate the pumping means when the motor is operative.

6. Apparatus according to claim 5, in combination with an electrical circuit including said solenoid and automatic control means for opening said electrical circuit to de-energized said solenoid after the pumping means has been operative for a predetermined period of time, said automatic control means comprising a ratchet wheel incorporating a contact plate adapted to be explored in concentric paths by a pair of wiping contact strips which connect said contact plate in the electrical circuit, one of said paths including an electrically non-conductive section, and a resilient arm associated with said ratchet wheel and adapted to be operated by said pumping means so as to rotate said ratchet wheel until the particular contact strip reaches the non-conductive section to open the electrical circuit.

7. Apparatus according to claim 5, wherein said pumping means includes a diaphragm which is adapted to be reciprocated by the other of said plungers when the solenoid is energized, and wherein the resilient means includes a helical spring one end of which is attached to said diaphragm and the other end of which is attached to a housing for said solenoid.

8. Apparatus for supplying a washing liquid to the windscreen of a motor vehicle, comprising a solenoid having a tubular passageway extending centrally therethrough, a pair of axially aligned rod-like plungers composed of magnetic material mounted to reciprocate lengthwise in said passageway, resilient spring means of predetermined strength for normally retaining said plungers in spaced relationship to each other in said passageway, a drive shaft adapted to be operatively connected to a motor and having a cam disc thereon, a cam roller riding on said disc, means operatively connecting said roller to one of said plungers for reciprocating said one of said plungers in said passageway, said connecting means including a return spring housed within said one plunger for urging said roller into engagement with said cam disc, and pumping means operatively connected to the other of said plungers for pumping liquid from a container onto said windscreen, the solenoid being operable to attract said plungers to bring them into abutting relationship against the force exerted by said resilient spring means when energized from a source of electric current to cause the one plunger to reciprocate the other plunger in said passageway to operate the pumping means when the motor is operative.

References Cited in the file of this patent

UNITED STATES PATENTS

| 40,206 | Wright | Oct. 6, 1863 |
| 960,249 | Beaudette | June 7, 1910 |
| 2,886,720 | Buck | May 12, 1959 |
| 2,896,456 | Hagopian | July 28, 1959 |
| 2,990,561 | Bock | July 4, 1961 |
| 3,080,595 | Oishei | Mar. 12, 1963 |

FOREIGN PATENTS

| 860,087 | Great Britain | Feb. 1, 1961 |
| 1,092,325 | Germany | Nov. 3, 1960 |